Dec. 22, 1964  W. MIESSEN  3,162,110
SELECTOR RING FOR PHOTOGRAPHIC UNITS
Filed July 23, 1962  2 Sheets-Sheet 1
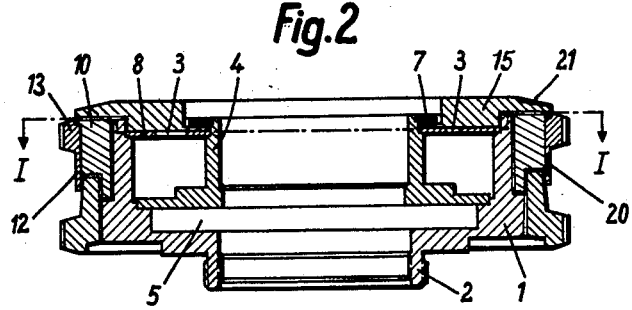
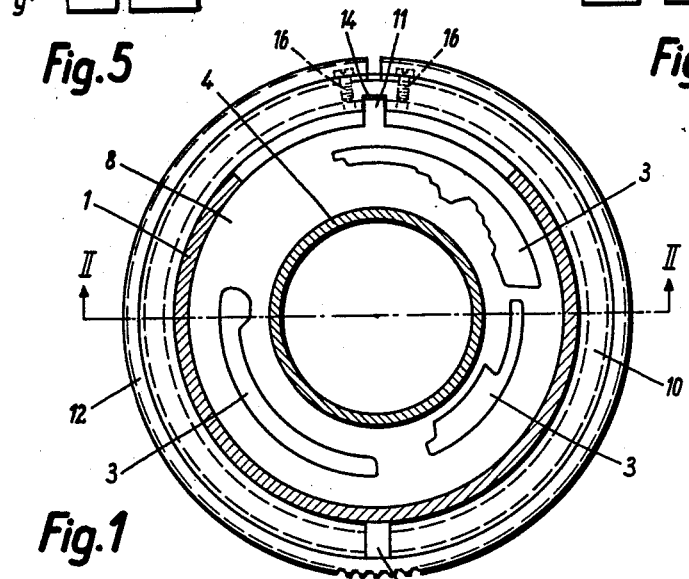
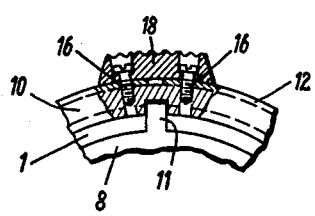
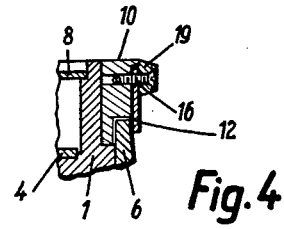

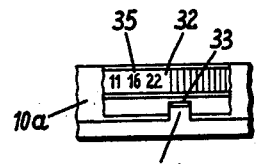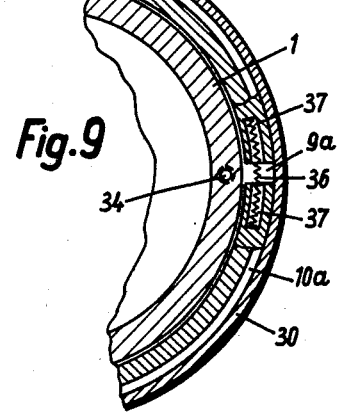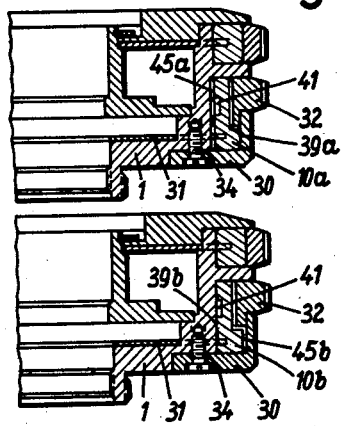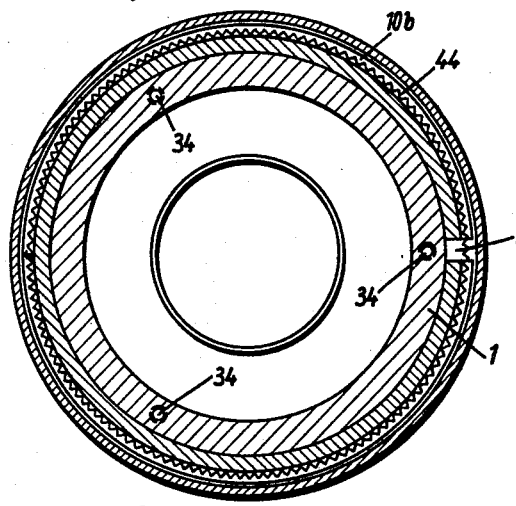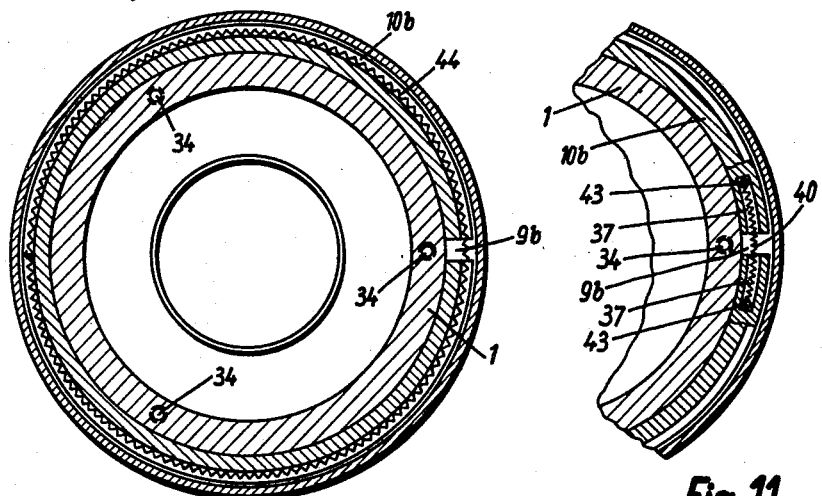

United States Patent Office 3,162,110
Patented Dec. 22, 1964

3,162,110
SELECTOR RING FOR PHOTOGRAPHIC UNITS
Walter Miessen, Munich, Germany, assignor to Compur-Werk G.m.b.H. & Co., Munich, Germany, a firm of Germany
Filed July 23, 1962, Ser. No. 211,648
Claims priority, application Germany, July 28, 1961, C 24,740; Aug. 3, 1961, C 24,791
18 Claims. (Cl. 95—44)

This invention relates to a selector ring for photographic units of various kinds.

As here used, the term selector ring is employed in a broad or generic sense, as meaning any ring which is adjustable or settable to select or determine a condition or value or quantity in connection with a photographic unit or device. The term photographic unit is likewise intended in a broad or generic sense, as meaning, for example, a photographic shutter, or a lens mount, or a range finder, or other units or devices useful in the photographic or optical field. As well understood by those skilled in these fields, many selector rings are employed in units of these types. For example, in many photographic shutters of the so called objective type, there is one selector ring for adjusting the shutter speed and another selector ring for adjusting the diaphragm aperture. In other types of shutters, there may be a ring for setting an exposure value, or a ring settable to different positions for selecting either automatic operation or manuel operation, or a ring for selecting operation of the unit according to flash illumination conditions or natural light conditions, or a ring for focusing the lens. Some of these kinds of selector rings may be mounted on units or devices other than shutters; for example, on separate lens mounts which are attachable to and detachable from shutters, the lens mounts themselves containing diaphragms, or focusing mechanisms, or other features which are to be controlled by the setting or movement of one or more selector rings. The present invention relates to the construction of the selector rings broadly, regardless of the character of the photographic unit or device on which the rings are mounted (as, for example, a shutter unit, or a separate lens mount unit) and regardless of the function performed by the ring (as, for example, setting the shutter speed, or setting the diaphragm aperture, or setting the focus of the lens). A shutter speed selecting ring will be disclosed as one specific embodiment of the invention, and a diaphragm aperture selecting ring will be disclosed as another specific embodiment of the invention, without intending thereby to limit the invention to these specific kinds of rings, for the reasons already explained above.

An object of the invention is the provision of a generally improved and more satisfactory selector ring of general utility on various kinds of photographic units or devices, as above explained.

Another object of the invention is the provision of a selector ring having plastic parts for engaging the stationary metal parts of the photographic unit on which the ring is mounted, in a manner to reduce the frictional resistance to turning the ring.

Still another object is the provision of a selector ring so designed and constructed as to maintain the ring in snug sliding engagement with the stationary parts on which it is mounted, thus overcoming both excessive looseness and excessive tightness, either of which might otherwise result from temperature changes in view of the great difference in coefficient of thermal expansion of the plastic material as compared with the metal parts of the photographic unit.

A further object is the provision of a selector ring so designed as to be capable of easy and inexpensive manufacture, and to be satisfactory in use notwithstanding the customary inability to maintain close tolerances when manufacturing articles from molded plastic material.

These and other desirable objects may be attained in the manner disclosed as an illustrative embodiment of the invention in the following description and in the accompanying drawings forming a part hereof, in which:

FIG. 1 is a sectional plan view of a selector ring suitable for adjusting the shutter speed of a photographic shutter, the section being taken approximately on the line I—I of FIG. 2;

FIG. 2 is a diametrical section through the selector ring and certain parts of a photographic shutter, taken approximately on the line II—II of FIG. 1;

FIG. 3 is a fragmentary section showing details of the mounting of a manipulating grip on the selector ring;

FIG. 4 is a radial section similar to a fragment of FIG. 2, illustrating the mounting of an easy-grip ring around the remainder of the selector ring;

FIG. 5 is a fragmentary face view showing one form of gap between the ends of the bearing ring;

FIG. 6 is a similar view showing another form of gap;

FIG. 7 is a fragmentary radial section taken axially through a portion of a photographic shutter unit, illustrating particularly a selector ring specifically intended for selecting or adjusting a diaphragm aperture;

FIG. 8 is a fragmentary side elevation illustrating certain details of the construction shown in FIG. 7;

FIG. 9 is a fragmentary section on a plane perpendicular to the optical axis, through the construction shown in FIG. 7, illustrating especially the arrangement for maintaining the desired degree of tightness between the plastic ring and the stationary metal parts;

FIG. 10 is a view similar to FIG. 7, illustrating a modified construction;

FIG. 11 is a view similar to FIG. 9, illustrating further details with respect to the structure shown in FIG. 10; and FIG. 12 is a transverse section perpendicular to the optical axis, showing still another construction for maintaining the desired tightness between the plastic ring and the stationary metal parts.

Referring first to FIGS. 1 and 2, an illustrative embodiment of the invention will now be described, merely by way of example, in connection with a selector ring for setting or adjusting the speed of operation of a photographic shutter. The shutter itself, except for the selector ring of the present invention, is an objective shutter of well known conventional construction, the details of which are unimportant for purposes of the present invention. It includes a main casing or housing indicated in general at 1, provided with a rear lens tube 2 and a front lens tube 4. The shutter blades (not shown) operate as usual within the cavity 5. The diaphragm leaves, if present, may also be in the same cavity. The various conventional operating parts of the shutter mechanism are controlled, in known manner, for determining the duration or speed of the photographic exposure, by various cam edges or configurations on one or more slots 3 on a speed control disk 8 which is mounted for rotation coaxially with the optical axis of the shutter, the disk 8 usually being rotatable on a shoulder formed near the front end of the front lens tube 4, and held against forward axial displacement therefrom by means of an overlying split ring 7 sprung into a circumferential groove in the lens tube 4. All of the parts thus far described, together with the conventional shutter operating mechanism, are well known in the art.

The present invention deals particularly with the construction of an external selector ring or setting ring which rotates around the outside of the shutter housing, and which is operatively connected to the internal cam ring or disk 8 to turn the same when the external ring is turned. The external selector ring, in this specific form of the invention, comprises a bearing ring 10 encircling the shutter housing and formed of a suitable plastic material, preferably a thermoplastic material such as polystyrene or polyacetal. Extending circumferentially around the bearing ring 10 is an encircling band or girth band 12 of metal. Preferably the band 12, as well as the housing 1, are of aluminum, although other metals may be used if desired.

The cam disk or internal ring 8 has, at one point of its periphery, a lug 11 extending approximately radially outwardly and engaging in a recess 14 formed in the inner face of the bearing ring 10, thus coupling the bearing ring 10 and the internal ring 8 to each other for conjoint rotation. The casing or housing of the photographic shutter is suitably recessed where necessary to give space for free rotary movement of the lug 11 throughout the required angular range.

Approximately diametrically opposite to the coupling 11, 14, the bearing ring 10 is split or divided, the opposite ends of the ring on opposite sides of the split being somewhat spaced circumferentially from each other. The ends may be cut off square, so as to leave a gap having straight sides in planes perpendicular to the plane of the ring, as shown at 9 in FIGS. 1 and 6. Alternatively, the gap may have any other suitable shape, such as shown at 9' in FIG. 5, where one of the ends of the bearing ring has a tongue extending circumferentially and slidably engaging in a circumferential notch in the other end of the bearing ring, as shown. This arrangement improves the mechanical strength of the bearing ring 10, in the direction of the optical axis.

The bearing ring 10 bears snugly against and is rotatable on the cylindrical outer face of the shutter housing member 1. It is held in place against rearward axial displacement by a shoulder on the housing 1, and against forward axial displacement by the front cover plate 15 of the shutter, which may be of conventional construction, the cover plate being of the usual annular form and being itself held against forward axial displacement by reason of a flange on the cover plate engaging beneath the previously mentioned split retaining ring 7, between this ring and the underlying member 8.

The metallic girth band 12 is also split at one point of its periphery, but this split is preferably at or near the location of the coupling parts 11, 14, thus being approximately diametrically opposite to the split 9 or 9' in the bearing ring 10. In this way, a continuous or unbroken part of the girth band 12 covers the split 9 or 9' in the plastic bearing ring 10. The ends of the girth band 12, on both sides of the split or gap therein, are attached to the bearing ring 10 by radial screws 16. By properly adjusting the tightness of the metallic girth band 12 on the outside of the plastic bearing ring 10, the plastic ring 10 may be caused to have the desired degree of tightness or snugness on the stationary metallic housing 1, notwithstanding the fact that a plastic ring cannot ordinarily be manufactured to close tolerances and therefore could not, as a practical matter, be made to fit on the shutter housing with the desired degree of snugness, if it were a circumferentially continuous ring without a gap or split and without having the girth band to hold it to the desired snugness. But with the arrangement of the present invention, as above described, the plastic bearing ring can be made to have just the right snugness to insure a smooth sliding motion when the selector ring is rotated to select or adjust the shutter speed or to adjust whatever other factor or variable is to be adjusted by the selector ring. If it is shutter speed which is to be adjusted, the periphery of the selector ring carries a shutter speed scale (preferably marked circumferentially on the periphery of the encircling band 12) which is read in conjunction with an index mark or reference point 21 on the stationary cover 15 of the shutter, in known manner.

Rotation of the selector ring is facilitated by the provision of suitable manipulating means or finger grip means. This may take various forms. For example, as shown in cross section in FIG. 2, the rear portion of the band 12 can be of relatively thin cylindrical form, while the front portion thereof is thickened in a radial direction to form a continuous circumferential rib 13, extending continuously around the circumference except where the band has the slight gap, and this rib 13 may have coarse serrations or teeth on its periphery, for convenient grasping by the fingers of the operator. Or again, the band 12 may be uniformly thin throughout, and at one or more points on its periphery, particularly at the point where there is a gap in the band, a separate serrated or tooth grip member 18 may be attached as shown in FIG. 3, the member 18 preferably bridging the gap between the cut ends of the band 12 and being retained in place by the same screws 16 which serve to fasten the band 12 to the plastic bearing ring 10. Or, in still another form of construction as shown in FIG. 4, the band 12 is of uniform thickness throughout, but a separate rib member 19 extends most of the way around the periphery of the band 12, bridges the gap between the ends of the band 12, and is secured by the screws 16 to the plastic bearing ring 10. This rib 19 is similar to the ribbed portion 13 in the form shown in FIG. 2, except that it is a separate piece applied to the outside face of the band 12, instead of being formed integrally as part of the band 12, and the rib 19 is similarly serrated or toothed on its outer edge.

The invention thus overcomes difficulties which are likely to arise when it is attempted to make a selector ring of plastic material. The bearing ring may be an injection-molded component, since the manufacture of the ring to close tolerances is not of major importance when the construction according to the present invention is employed. For mounting the selector ring, the individual components are preferably assembled consecutively. That is, the bearing ring 10 and the band 12 are pushed axially on to the shutter casing or housing, while the round shape of the ring 10 is maintained by a simple assembly jig. The holes for the screws 16 are then drilled after the parts are assembled on the shutter housing, the holes being located in such positions as to maintain the desired tightness of the bearing ring 10 on the shutter housing. The assembly jig has a diameter which will insure that the assembled components of the selector ring will rotate smoothly and easily on the shutter housing or other photographic unit on which the ring is used. Since the band 12 and the casing or housing 1 both consist preferably of the same material (aluminum) their respective thermal expansions are the same, and the greater peripheral expansion of the plastic bearing ring 10 is allowed for by the gap 9. Consequently, the clearances initially set or allowed for during assembly, will not be affected by temperature changes.

In an alternative method of assembly, the components of the selector rings are mounted on an assembly core to maintain their round shape, and while thus mounted they are connected together with screws in the manner already explained, and then the completely assembled ring is pushed in an axial direction onto the housing of the photographic unit on which it is to be used.

As a further alternative manner of assembly, the holes required in the metallic band 12 and in the plastic bearing ring 10 are drilled prior to final assembly, but the holes in the band 12 are made of slightly larger diameter than the screws, or at least are slightly elongated slotlike in a circumferential direction. Then after the screws are started through the metal band into the plastic material, but before they are fully tightened, the circumferential tension of the parts can be adjusted within the limits of the circumferential elongation of the screw holes, and when the proper degree of tension is achieved, the screws are finally tightened to hold the parts with the desired firmness on the housing or casing.

A slightly different form of construction according to the invention is illustrated in FIGS. 7–9. The ring is here shown, but only for the sake of example, as a ring for selecting or setting a diaphragm aperture. The housing or casing of the unit is shown at 1, as before. The bearing ring of plastic material, circumferentially surround the housing, is indicated at 10a, and is divided at one point by a gap 9a. The ring is coupled with a diaphragm actuating ring 31 which is provided with the usual cam slots (not shown) for causing adjusting movement of the diaphragm leaves as the ring 31 is rotated. The coupling between the internal ring 31 and the external ring 10a may be by means of a radially projecting lug in one of the parts, engaging a notch or recess in the other of these parts, in a manner similar to the lug 11 and notch 14 in FIG. 1.

Secured to the casing 1 by screws 34 is an aluminum mounting flange 30 of L-shaped cross section, which extends radially outwardly from the rear face of the casing 1, and then axially forwardly, as shown. While it is a separate piece from the body of the casing, it may nevertheless be considered as part of the casing in a broad sense. The forwardly extending part of this mounting member 30 has an internal annular bearing face 39a, of cylindrical form, on which a narrow outer peripheral face of the plastic bearing ring 10a slides. In this construction, it is the outer face of the plastic ring 10a (or at least the rear portion thereof) which makes contact with and slides on the bearing surface formed by the inner face of the metallic member 30, whereas the inner face of the plastic bearing ring 10a has a clearance or slight space from the outer face of the main body of the casing 1, as seen at 45a in FIG. 7. If desired, control cams may be cast into the inner face or any other desired part of the plastic bearing ring 10a, for controlling any desired functions of various kinds, such as to set selectable flash factors. Such cam portions are indicated schematically at 41 in FIGS. 7 and 10. Attached to the plastic bearing ring 10a is an encircling girth band 32 preferably having a radially thickened rib provided with easy-grip serrations extending around its circumference, similar to those described in connection with the parts 13 and 19 in FIGS. 2 and 4, respectively.

The bearing ring 10a is cast or molded as an integral member, with its lug or recess, as the case may be, for engaging with the recess or lug, respectively, of the member 31, and with its cams 41 (if any) and when initially cast or molded, its outside diameter is arranged to be slightly greater than the internal diameter of the bearing face 39a with which it is to mate. Because of the gap or space 9a, the bearing ring can be slightly sprung to reduce its diameter so that it can be inserted into the face 39a of the part 30. Thus the bearing ring is, on the one hand, constrained to keep its circular shape and it will, on the other hand, easily and smoothly slide inside the mount when rotated. The gap 9a makes allowance for any peripheral expansion resulting from temperature fluctuations, as in the previous embodiments. Differential expansion between the parts of the metal casing and the plastic bearing ring, in a radial direction, are taken up by the air gap 45a between the inner face of the plastic ring and the outer face of the adjacent part of the casing 1, as seen in FIG. 1.

The desired degree of elastic contact between the parts 10a and 30 may be assisted by the provision of a compression spring 36, located as shown in FIG. 9. The spring 36 is interposed in the gap 9a, and the two ends of the spring are inserted into circumferentially extending bores 37 in the ends of the ring 10a, so that the spring 36 urges the two ends of the ring 10a resiliently apart, tending to expand the ring to the desired extent to keep it snugly engaged with the bearing face 39a of the mounting member 30.

As in the earlier described embodiments, the external metallic ring part 32 of the selector ring assembly bridges the gap 9a in the plastic part of the assembly, and is held on the plastic ring in any suitable manner, preferably by radial screws similar to the screws 16 previously described. However, it is within the contemplation of the invention to make the ring 32 a solid and rigid metallic ring, rather than a split ring, slightly spaced outwardly from the plastic ring 10a and having its own guiding bearing on the inner cylindrical face of the casing flange member 30. With such a construction, a radially extending ear or lug 10a′ (FIG. 8) cast integrally on the plastic ring 10a engages in a corresponding notch 33 in the metallic ring 32, to couple these two members for conjoint rotation. The lug 10a′ is preferably diametrically opposite the gap 9a in the plastic ring.

The embodiment illustrated in FIGS. 10 and 11 is similar to that in FIGS. 7 and 9, respectively, except that here the mating surfaces of the plastic ring and of the stationary metal body on which it slides, are at the inner face of the plastic ring rather than the outer face thereof. The plastic ring is here shown at 10b and bears with its inner face against the adjacent cylindrical portion of the stationary metallic casing 1, while there is an air gap 45b between the outer face of the ring and the adjacent annular face of the mounting member 30. Close sliding contact is maintained by making the ring initially of a slightly smaller internal diameter than the external diameter of the part 1 on which it is to slide, so that when the parts are assembled, the ring is sprung slightly to enlarge its diameter to enable it to be slipped onto the casing 1. Except for this reversal of bearing faces, the construction is similar to what has been described in connection with FIGS. 7 and 9. But in this present embodiment (FIGS. 10 and 11) the metallic flange 30 serves to hold the plastic ring only against axial displacement, as it does not form a radial bearing for the plastic ring. There is a radial air gap 45b between the plastic ring and the member 30, as already mentioned, to compensate for differential expansions of metal and plastic. The inner cylindrical face of the casing flange 30 may, however, still form a radial bearing for an external face of the metallic ring 32, just as described above in connection with FIG. 7.

FIG. 11 shows a construction for improving the elastic contraction of the bearing ring 10b. This is similar to but the reverse of what has already been described in connection with FIG. 9. Here there is a circumferentially extending spring 40 bridging the gap 9b in the plastic ring 10b, but this spring 40 is a tension spring rather than a compression spring like 36 in FIG. 9. The ends of the tension spring 40 extend into the circumferential bores 37 in the ends of the ring 10b, and are anchored therein by pins 43. Thus the spring 40 pulls the ends of the ring 10b toward each other, and constantly tends to contract it with the desired force, to cause it to hug snugly against the surface of the casing 1 on which it bears, to maintain tight sliding contact with the cylindrical bearing face of the casing 1.

In FIG. 12, the construction is quite similar to that just described in connection with FIGS. 10 and 11, except that here the tension spring 44 is not just a short spring in the vicinity of the gap 9b, but is a continuous spring extending all the way around the periphery of the plastic ring 10b. Its function is the same, in that it tends to contract the diameter of the plastic ring 10b, to cause it to hug or embrace the stationary casing 1 with the desired force for snug engagement and smooth rotary sliding motion. Steel wire rings or leaf spring rings may, if desired, replace the coiled spring 44, for performing the same function.

In FIGS. 7 and 10, another ring without reference numerals has been shown on the casing of the photographic unit, forwardly of the diaphragm aperture selector ring which has been particularly described. This other ring at the forward part of the casing may represent, for example, a shutter speed control ring, or a focusing ring, or a flash illumination selector ring, or a ring performing any other known function useful in connection with the photographic unit or device on which it is mounted. It may have any of the constructions previously described.

If desired, the sliding properties of the plastic bearing ring can be improved by the use of self-lubricating additives impregnating the plastic material, such additives being known per se in the plastics art.

When describing the selector ring as being associated with a rotationally stationary casing or housing, what is meant is that the casing or housing does not rotate, but this does not exclude axial movement of the casing or housing, since such axial movement (carrying the selector ring with it) does occur in connection with focusing certain types of cameras and enlargers and projectors. Of course even the casing on which the selector ring is mounted, may rotate under some conditions without affecting the invention.

It is seen from the foregoing disclosure that the objects and purposes of the invention are well fulfilled. It is to be understood that the foregoing disclosure is given by way of illustrative example only, rather than by way of limitation, and that without departing from the invention, the details may be varied within the scope of the appended claims.

What is claimed is:

1. In a photographic unit, the combination of a casing, a setting disk rotatable within said casing, a selector ring rotatable on said casing substantially concentrically with said disk, and a coupling between said ring and said disk to cause them to rotate together, characterized by the fact that said selector ring includes a ring of plastic material bearing on said casing and rotatable thereon and having a gap at one point of its circumference to allow for differences in thermal expansion between said casing and said ring of plastic material, and metallic means extending across the gap in said plastic ring and turning with said plastic ring and assisting in holding said plastic ring in snug sliding engagement with the part of said casing against which it bears while turning.

2. In a photographic unit, the combination of a casing having a circular cylindrical face portion, a setting disk rotatable within said casing, a selector ring rotatable on said casing substantially concentrically with said disk, and a coupling between said ring and said disk to cause them to rotate together, characterized by the fact that said selector ring includes a ring of plastic material bearing on said circular cylindrical face portion of said casing for rotational sliding thereon and having a gap at one point of its circumference to allow for differences in thermal expansion between said ring of plastic material and said circular face portion of said casing.

3. In a photographic unit, the combination of a casing having a circular cylindrical face portion, a setting disk rotatable within said casing, a selector ring rotatable on said casing substantially concentrically with said disk, and a coupling between said ring and said disk to cause them to rotate together, characterized by the fact that said selector ring includes a ring of plastic material bearing on said circular cylindrical face portion of said casing for rotational sliding thereon and having a gap at one point of its circumference to allow for differences in thermal expansion between said ring of plastic material and said circular face portion of said casing, and that said selector ring also includes an outer cylindrical part of metal encircling said ring of plastic material to hold the plastic ring in proper ring shape.

4. In a photographic unit, the combination of a casing having a circular cylindrical face portion, a setting disk rotatable within said casing, a selector ring rotatable on said casing substantially concentrically with said disk, and a coupling between said ring and said disk to cause them to rotate together, characterized by the fact that said selector ring includes a ring of plastic material bearing on said circular cylindrical face portion of said casing for rotational sliding thereon and having a gap at one point of its circumference to allow for differences in thermal expansion between said ring of plastic material and said circular face portion of said casing, and that said selector ring also includes a band of metal encircling said ring of plastic material and bridging the gap therein to hold the plastic ring in proper shape, said metal band also having a gap therein at a point spaced a substantial distance circumferentially from the gap in the plastic ring.

5. In a photographic unit, the combination of a casing having a circular cylindrical face portion, a setting disk rotatable within said casing, a selector ring rotatable on said casing substantially concentrically with said disk, and a coupling between said ring and said disk to cause them to rotate together, characterized by the fact that said selector ring includes a ring of plastic material bearing on said circular cylindrical face portion of said casing for rotational sliding thereon and having a gap at one point of its circumference to allow for differences in thermal expansion between said ring of plastic material and said circular face portion of said casing, and that said selector ring also includes a band of metal encircling said ring of plastic material to hold the plastic ring in proper shape, said metal band also having a gap therein at a point approximately diametrically opposite the gap in the plastic ring, the ends of the metal band on opposite sides of its gap being anchored to said plastic ring.

6. In a photographic unit, the combination of a casing having a circular cylindrical face portion, a setting disk rotatable within said casing, a selector ring rotatable on said casing substantially concentrically with said disk, and a coupling between said ring and said disk to cause them to rotate together, characterized by the fact that said selector ring includes a ring of plastic material bearing on said circular cylindrical face portion of said casing for rotational sliding thereon and having a gap at one point of its circumference to allow for differences in thermal expansion between said ring of plastic material and said circular face portion of said casing, and that said selector ring also includes a band of metal encircling said ring of plastic material to hold the plastic ring in proper shape, said metal band also having a gap therein at a point approximately diametriclly opposite the gap in the plastic ring, the ends of the metal band on opposite sides of its gap being anchored to said plastic ring by screw means.

7. A construction as defined in claim 2, in which said coupling between said ring and disk is in the form of a lug on one of them engaging in a recess in the other of them, characterized by the fact that said coupling is at a point approximately diametrically opposite said gap in said plastic ring.

8. A construction as defined in claim 5, in which said coupling between said ring and disk is in the form of a lug on one of them engaging in a recess in the other of them, characterized by the fact that said coupling is at a point approximately diametrically opposite said gap in said plastic ring.

9. A construction as defined in claim 8, wherein both said band and the part of said casing having said circular cylindrical face are of materials having approximately the same coefficient of thermal expansion.

10. A construction as defined in claim 2, wherein said circular cylindrical face portion of said casing is an external face and is surrounded by and in sliding contact with an inner face of said ring of plastic material.

11. A construction as defined in claim 10, further including resilient means tending to contract the diameter of said ring of plastic material to keep it snugly engaged with said cylindrical face of said casing.

12. A construction as defined in claim 11, wherein said resilient means is a coiled tension spring.

13. A construction as defined in claim 2, wherein said circular cylindrical face portion of said casing is an internal face overlapping and in sliding contact with only a portion of the axial width of the outer face of said ring of plastic material.

14. A construction as defined in claim 13, further including resilient means tending to expand the diameter of said ring of plastic material to keep said portion of the width of its outer face snugly engaged with said internal cylindrical face of said casing.

15. A construction as defined in claim 14, wherein said resilient means is a coiled compression spring.

16. A construction as defined in claim 15, wherein the ends of said ring of plastic material adjacent said gap have bores extending in circumferential directions from said gap, and wherein the ends of said coiled compression spring are located in said bores.

17. A construction as defined in claim 2, wherein at least one control cam is formed on said ring of plastic material.

18. A construction as defined in claim 2, wherein a setting scale is marked circumferentially on said selector ring.

References Cited by the Examiner
UNITED STATES PATENTS

| | | | |
|---|---|---|---|
| 2,863,358 | 12/58 | Czarnikow | 88—57 |
| 2,956,492 | 11/60 | Quick | 95—64 |
| 3,070,389 | 12/62 | Baur | 88—57 |

NORTON ANSHER, *Primary Examiner.*

JOHN M. HORAN, *Examiner.*